July 29, 1952

L. S. DEPWEG 2,604,869

TUNING INDICATOR FOR COMBINED TELEVISION AND FREQUENCY MODULATION RECEIVER

Filed Nov. 18, 1949

4 Sheets-Sheet 1

INVENTOR.
LEONARD S. DEPWEG
BY
Alden D. Redfield
ATTORNEY.

July 29, 1952 L. S. DEPWEG 2,604,869
TUNING INDICATOR FOR COMBINED TELEVISION AND FREQUENCY MODULATION RECEIVER
Filed Nov. 18, 1949 4 Sheets-Sheet 2
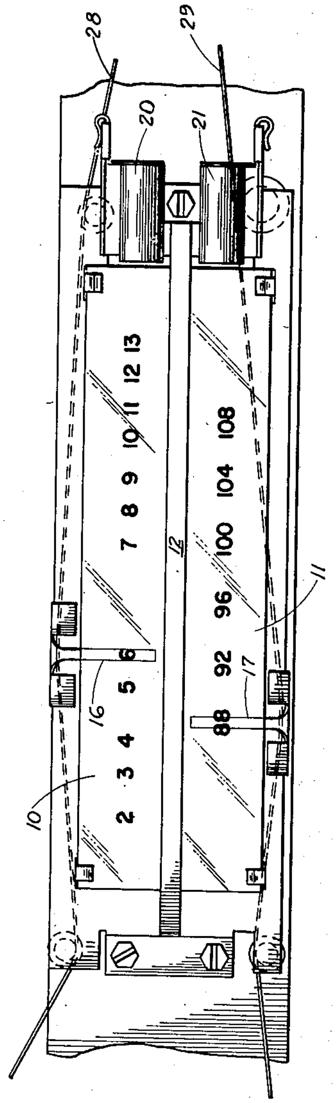
Fig. 3
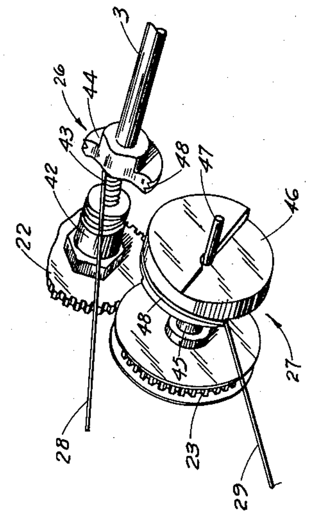
Fig. 3-B
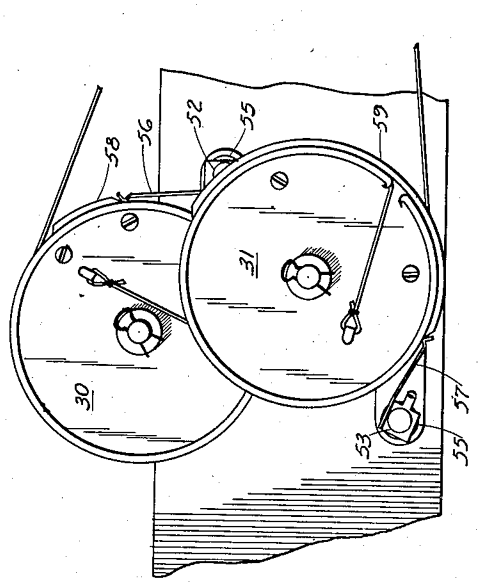
Fig. 3-A
INVENTOR.
LEONARD S. DEPWEG
BY
Alden D. Redfield
ATTORNEY.

July 29, 1952 L. S. DEPWEG 2,604,869
TUNING INDICATOR FOR COMBINED TELEVISION AND FREQUENCY MODULATION RECEIVER
Filed Nov. 18, 1949 4 Sheets-Sheet 3
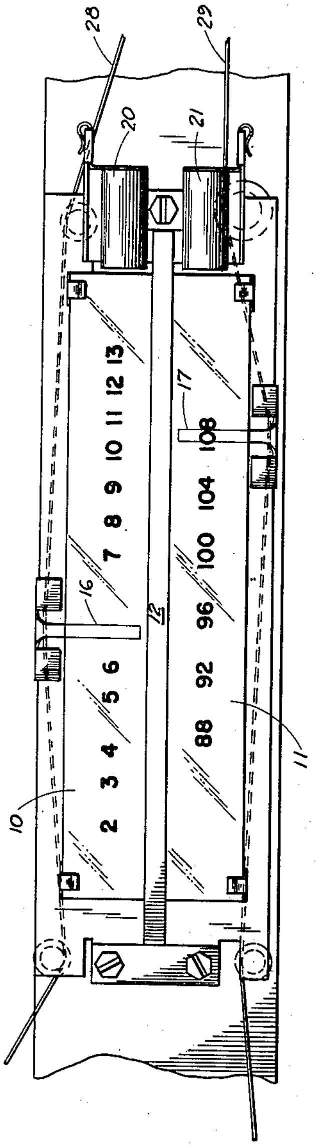
Fig. 4
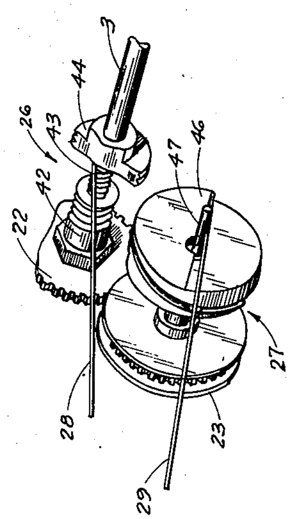
Fig. 4-B
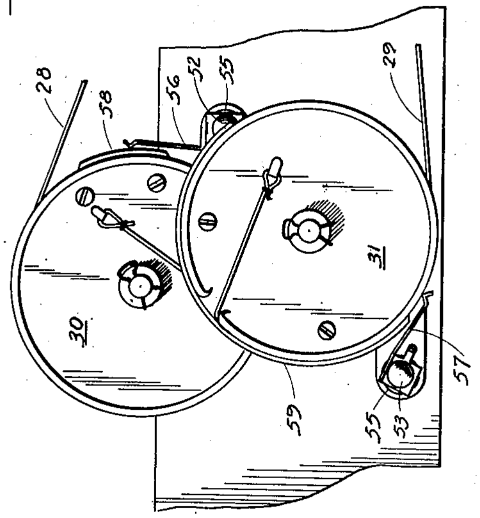
Fig. 4-A
INVENTOR.
LEONARD S. DEPWEG
BY Allen D. Redfield
ATTORNEY July 29, 1952
L. S. DEPWEG
TUNING INDICATOR FOR COMBINED TELEVISION AND FREQUENCY MODULATION RECEIVER
2,604,869
Filed Nov. 18, 1949
4 Sheets-Sheet 4
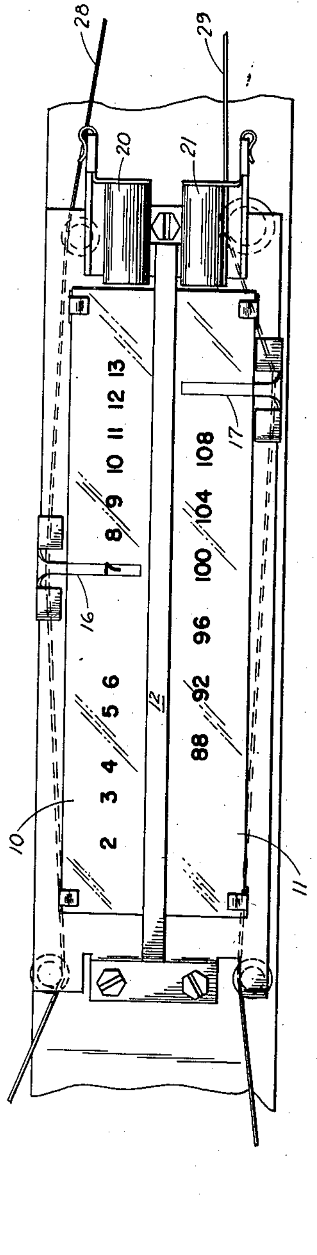
Fig. 5
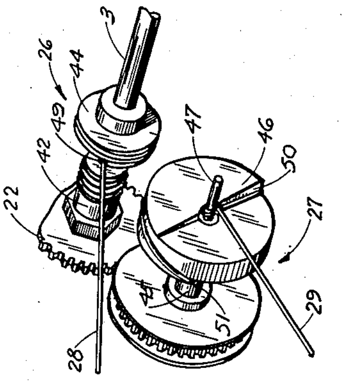
Fig. 5-B
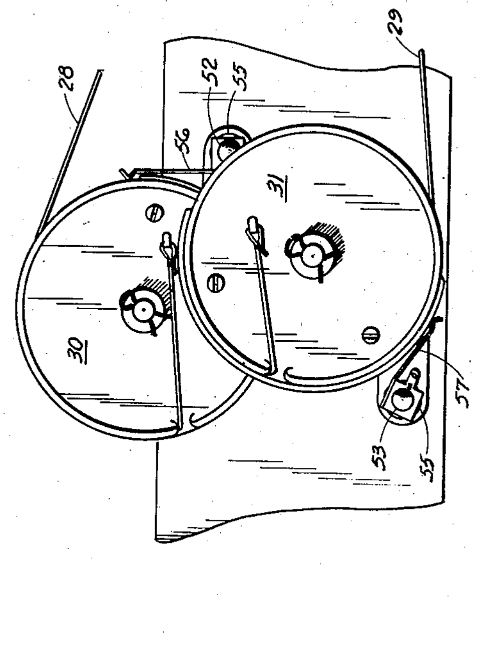
Fig. 5-A
INVENTOR.
LEONARD S. DEPWEG
BY Alden D. Redfield
ATTORNEY Patented July 29, 1952

2,604,869

UNITED STATES PATENT OFFICE 2,604,869

TUNING INDICATOR FOR COMBINED TELEVISION AND FREQUENCY MODULATION RECEIVER

Leonard S. Depweg, Hamilton, Ohio, assignor to Avco Manufacturing Corporation, Cincinnati, Ohio, a corporation of Delaware Application November 18, 1949, Serial No. 128,169

16 Claims. (Cl. 116—124.4)

The present invention relates to a tuning indicator for use in conjunction with receivers designed to receive television and frequency modulated stations. This invention has particular relation to a tuning indicator for use with a combined television and frequency modulation receiver where appearance, simplicity and durability as well as economy are important factors.

In the United States the high frequency transmission band has been divided in such a fashion that approximately one-half of the available television channels appear consecutively in one part of the band whereas the remaining television channels appear consecutively in another part of the band, the intervening portion of the band being allocated in part for the use of frequency modulated (FM) transmitting stations. A particularly desirable feature of the herein disclosed invention is its construction and arrangement whereby it is possible for a person, tuning the receiver, to rotate manually a single control shaft, not only to tune the receiver to each of the television channels but also to tune it to any of the frequency modulated stations which may be within the range of the receiver. In the course of continued rotation of the single control shaft, television and frequency modulation reception is automatically and alternately instituted without the use of any switches or the necessity of resorting to independent or separate tuning selectors.

The present invention contemplates the use of a pair of co-planar parallel slide-rule type dials across which pointers are moved as the receiver is tuned, one dial being devoted to television stations and the other dial to FM stations. The television dial has two spaced groups of indicia representing the upper and lower parts of the television band. The other dial, which is adjacent, has a single group of indicia representing the FM band, the indicia being disposed more or less intermediate of the groups of indicia on the television dial. The pointers are movable relative to the dials and indicate by their positions the television or FM station being received. By means of the novel structure herein disclosed, the pointers are alternately illuminated so as to indicate clearly to the person tuning the receiver exactly what type of station is being received.

It is, therefore, an object of the herein disclosed invention to provide a simple, compact indicating device on which both television and FM reception can be indicated while a single tuning control is adjusted. Another object of the invention is the provision of a novel switching structure by means of which the dials of the device are alternately illuminated to make it obvious as to which dial is indicating stations being received. To accentuate the effect of alternate illumination, the use of dials of different colors is contemplated.

Another advantage of the structure herein disclosed is that it incorporates simple and effective means for producing a relatively large movement of the FM indicating pointer in response to a relatively small adjustment of the tuning control, this being a particularly advantageous feature in view of the fact that the allocated FM band encompasses merely 20 megacycles compared to an aggregate of 76 megacycles for television.

Another advantage of the herein described invention is its mode of operation in accordance with which a pair of indicating pointers travel the length of a pair of parallel slide-rule type dials to indicate television and FM reception, the rate of travel of the pointers varying periodically during their travel despite the fact that the rate of adjustment of the tuning device remains constant.

The novel features that are considered characteristic of the invention are set forth in the appended claims; the invention itself, however, both as to its organization and method of operation together with additional objects and advantages thereof will best be understood from the following description of a specific embodiment when read in conjunction with the accompanying drawings in which:

Figure 3 shows, to an enlarged scale, an elevational view of the slide-rule indicating dials, the indicator pointers showing that the receiver is tuned for reception on television channel 6 at a frequency just below the lowest frequency of the FM transmitting range.

Figure 3A shows a pair of spring urged string reservoirs, which are components of the actuating mechanism, in positions corresponding to the positions of the indicator pointers shown in Figure 3.

Figure 3B shows actuating drums operatively associated with the indicator pointers also in a position corresponding to the position of indicator pointers shown in Figure 3.

Figure 4 shows, to an enlarged scale, an elevational view of the slide-rule dials with the points indicating that the receiver is tuned for reception at the upper part of the FM transmitting range.

Figures 4A and 4B show the corresponding positions of the string reservoirs and actuating drums respectively, in positions corresponding to the positions of the indicator pointers of Figure 4.

Figure 5 shows the slide rule dials with the pointers indicating that the receiver is tuned to television channel 7 at a frequency above the highest frequency of the FM band.

Figures 5A and 5B show the reservoir and actuating drums, respectively, in positions corresponding to the positions of the pointers shown in Figure 5.

*General description*

Figure 1:
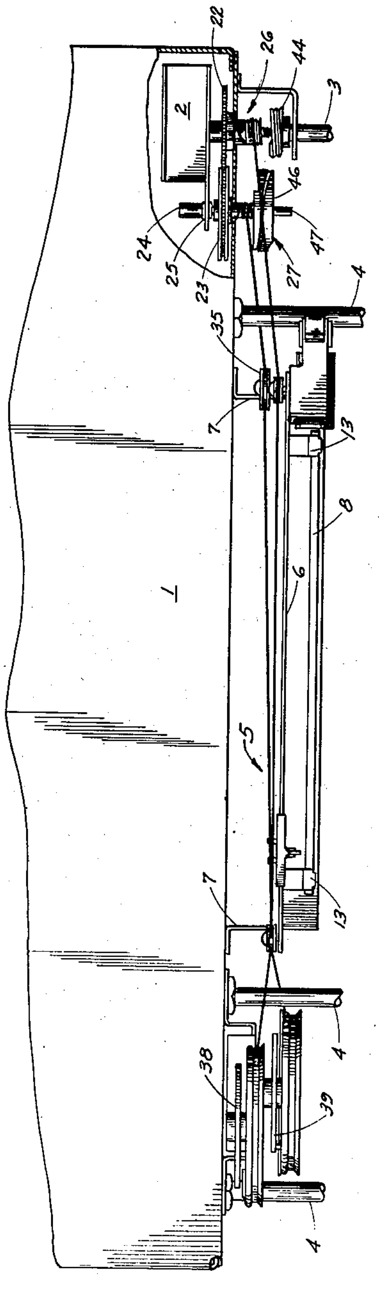
Figure 1 shows a top plan view of the indicator dials and associated actuating mechanism.
Figure 2:
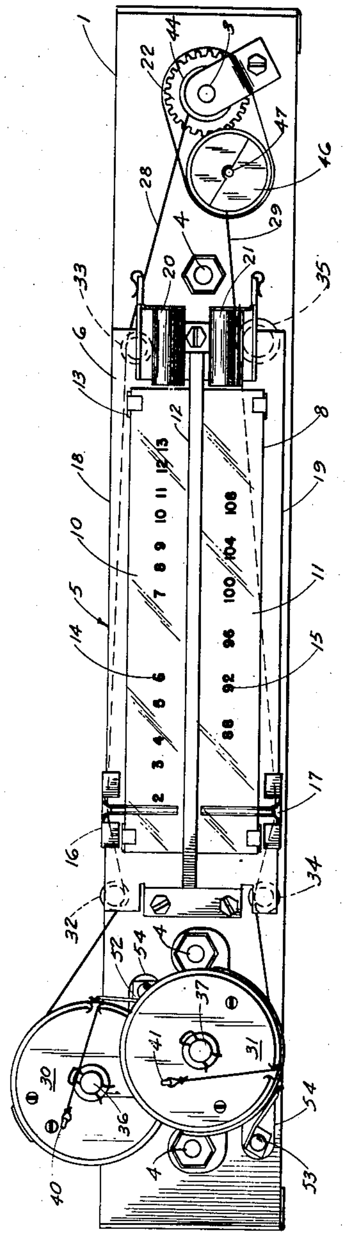
Figure 2 shows, to the same scale used in Figure 1, the front elevational view of the entire tuning mechanism with the indicator pointers indicating that the receiver is tuned to a frequency just below that of television channel 2.

With particular reference to Figures 1 and 2 a preferred embodiment of the present invention is shown secured to chassis 1 of a combined television and FM receiver. Secured to a portion of the chassis by means not shown is a manually adjustable selector control 2 which may be any variable inductance selector such as conventionally used in combined television-FM receivers. Selector 2 is provided with an outstanding control shaft 3 rotation of which varies the tuning of the receiver and makes possible reception of various television and FM stations. Auxiliary control shafts 4 are also shown, being conventional controls normally found on standard receivers.

As shown in Figure 2, the present invention incorporates a dial section, generally designated 5. The dial section incorporates a background panel 6 held in parallel spaced relationship to chassis 1 by brackets 7. A transparent indicator panel 8, divided into upper and lower slide-rule type dials 10 and 11, respectively, by an opaque horizontal divider bar 12, is held in parallel spaced relationship to background panel 6 by brackets 13.

The transparent indicator panel may be made from any suitable transparent material such as plastic or glass and has engraved on its rear face indicia 14 and 15. Indicia 14 comprise numerals 2 through 13 indicating the principal United States television channels. For a purpose which will be described more fully hereinafter, the numerals are located in two groups, a relatively large space being provided between numerals 6 and 7. Indicia 15 comprise numbers from 88 to 108 inclusive representing the FM transmitting band. These numbers are evenly spaced on the center portion of slide-rule dial 11 more or less intermediate of the two groups of numerals on the upper dial 10.

Pointers 16 and 17 are formed to engage and slide on the top and bottom longitudinal edges, 18 and 19, respectively, of background panel 6 and may be made from sheet metal or plastic in any conventional manner well known in the art.

As shown in Figures 2, 3 4, and 5 pointers 16 and 17 are proportioned so as to extend across the cooperating faces of the slide-rule dials 10 and 11, respectively, the pointers being disposed to move in a common plane behind the slide-rule dials and indicating by their positions relative to the indicia the station to which the receiver is tuned.

*Tuning sequence*

A novel mechanism, to be more fully described hereinafter, moves the pointers longitudinally across the face of the slide-rule dials in response to rotation of control shaft 3 of the selector, the rate of travel of the pointers varying periodically while the control shaft is rotated at a constant rate. When the receiver is tuned to a frequency slightly below that of television channel 2, the pointers are disposed in a position shown in Figure 2, the frequency to which the set is then tuned being approximately 54 megacycles. As the shaft of the selector is rotated continuously in a clockwise direction, both pointers move toward the right (as viewed in Figures 2, 3, 4, and 5). Pointer 16 moves into alignment successively with numerals 3, 4, 5, and 6 of slide-rule dial 10 as the receiver is tuned for the reception of the corresponding television channels, the sound carrier for channel 6 having a broadcast frequency of 88 megacycles. During this time, pointer 17 moves slowly from the position of Figure 2 to the position shown in Figure 3.

With reference to Figure 3, pointer 16 is aligned with numeral 6 of slide-rule dial 10 simultaneously with the alignment of pointer 17 with number 88 of slide-rule dial 11. Additional movement of the pointers toward the right, in response to continued rotation of the selector control shaft, causes pointer 17 to move rapidly past numbers 88 to 108 inclusive, thus indicating various FM stations to which the receiver is tuned. While FM stations are being received, the television section of the receiver is rendered inactive and the television pointer 16 moves at a decreased rate of travel, compared to its previous motion, between the positions shown in Figure 3 and Figure 4. Movement of pointer 17 from 88 to 108 on slide-rule dial 11 indicates that the receiver has been tuned to frequencies between 88.1 and 107.9 megacycles which is the range of the transmitting band allocated to FM stations in the United States.

Continued rotation of the selector control shaft moves pointers 16 and 17 gradually to the position shown in Figure 5, in which position the receiver resumes reception of television and no longer is tuned to FM stations. As shown in Figure 5 the first television channel occurring above the FM range is channel 7 which is broadcast at a frequency of 174 megacycles. Inasmuch as the highest broadcast frequency of FM stations is 107.9 megacycles and the lowest frequency of the upper portion of the television band is 174 megacycles, it is obvious that the receiver must be tuned across a frequency range in which no reception is possible, this frequency range being reserved by the Federal Communications Commission for other types of broadcasting activity. Accordingly, during the time that pointers 16 and 17 move from the positions shown in Figure 4 to the positions shown in Figure 5 no standard television or FM reception is possible.

As rotation of the selector shaft is continued, pointer 16 moves at an increased rate of travel from numeral 7 to numeral 13 (216 megacycles) of slide-rule dial 10, indicating reception of the corresponding television channels. Simultaneously, pointer 17 moves slowly from 108 to the right on slide-rule dial 11, being ineffective for indicating purposes.

Rotation of the control shaft of the selector in a counterclockwise direction reverses the direction of motion of the pointers and tunes the receiver in a correspondingly reverse order, the pointers eventually being returned to the initial position shown in Figure 2.

As an aid to the person tuning the receiver, lights 20 and 21 are provided to illuminate dials 10 and 11, respectively. The lights are energized alternately to illuminate each of the slide-rule dials in turn when it is actively indicating stations being received. These lights are energized by cam actuated switches to be described more fully hereinafter.

*Actuating mechanism*

The mechanism for imparting movement to pointers 16 and 17 comprises a spur gear 22 secured to control shaft 3 for conjoint rotation. Gear 22 meshes with flanged gear 23 which is secured to an auxiliary idler shaft 24, mounted by conventional means 25 for driven rotation about a fixed axis in response to the rotation of gear 22. Actuating drums, generally designated 26 and 27, are secured respectively to shafts 3 and 24 for corresponding rotation therewith. A string 28 is wound and unwound on actuating drum 26 as shaft 3 is rotated to effect adjustment of the selector. Pointer 16 is adjustably secured to string 28 for movement therewith, the string being connected at its right end to actuating drum 26 and at its other end to a drum shaped string reservoir 30. In like manner string 29 is wound and unwound by the rotation of actuating drum 27 thereby moving attached pointer 17, this string being secured at its ends to the associated actuating drum and a second string reservoir 31. Guide sheaves 32 and 33 are pivotally secured to background panel 6 to guide movements of string 28; corresponding guide sheaves 34 and 35 are provided for string 29. Sheave 35 is mounted for axial as well as rotary movement to favor engagement with string 29 at all times as the string is wound and unwound on its actuating drum.

The string reservoir drums 30 and 31 are pivotally secured on fixed journals 36 and 37, respectively, reservoir drum 31 being spaced forward of drum 30 as clearly indicated in Figures 1 and 2. Cooperating with drums 30 and 31 are torsion springs 38 and 39, respectively. The torsion springs are attached in a conventional manner to the journals and drums proper to impose a counterclockwise torque on drum 30 and a clockwise torque on drum 31 at all times. By means of these torsion springs, strings 28 and 29 are kept constantly under tension. While the strings are wound on the associated actuating drums, energy is stored in the springs which subsequently acts to reverse the movement of the strings and associated pointers when rotation of the actuating drums permits unwinding of the strings.

Integrally formed hooks 40 and 41 are provided on drums 30 and 31 to facilitate the attachment thereto of the left ends of string 28 and 29, respectively.

Clockwise rotation of selector shaft 3 (as viewed in Figures 2, 3, 4, and 5) causes string 28 to be wound up on the motion translating means or actuating drum 26, thus causing clockwise rotation of reservoir drum 30 in opposition to its torsion spring. During such rotation of the selector shaft, pointer 16 moves from the left toward the right behind slide-rule scale 10. By virtue of gears 22 and 23, clockwise rotation of the selector shaft causes counterclockwise rotation of auxiliary shaft 24 and its associated motion transferring means or actuating drum 27, such counterclockwise rotation causing string 29 to be wound up on the actuating drum and consequent counterclockwise rotation of reservoir drum 31 in opposition to its associated torsion spring. During this movement of string 29, pointer 17 is drawn from left toward right behind slide-rule scale 11.

The movement of pointers 16 and 17 to the right is not at a uniform rate but varies despite a constant rate of rotation of the associated actuating drums. The varying rate of movement is created by variations in the diameters of the actuating drums by which the strings are wound and unwound.

As string 28 is wound on actuating drum 26 in the course of moving pointer 16 from the extreme left to the extreme right position, this string first is engaged by a medium diameter section 42, then by a small diameter section 43 and finally by a section 44 of large diameter. In a comparable manner, while pointer 17 moves from the extreme left to the extreme right, string 29 is wound on sections of medium, large and small diameter 45, 46 and 47, respectively, formed on actuating drum 27.

As illustrated in Figures 3B, 4B and 5B a plurality of spiral grooves 48 are provided on the peripheries of the various sections to guide and prevent axial shifting of the strings relative to the actuating drums.

As best shown in Figure 5B, section 44 of drum 26 and section 46 of drum 27 are formed in such a way that the associated strings feed uniformly to and from the adjacent sections of different diameter. This is accomplished by relieving axially one-half of the rear face of section 44 along a diameter 49. The front and rear faces of section 46 are also relieved axially along diameters 50 and 51, respectively. The disposition of the spiral guide grooves relative to the relieved areas on the faces of the drum sections permits a smooth transition of the strings from one section to another as they are wound axially on the actuating drums.

While string 28 is in winding engagement with section 42, pointer 16 traverses the lower portion of the television band; and while it is engaged by section 44, it traverses the upper portion of the band. Small diameter section 43, disposed intermediate the relatively larger sections, is in winding engagement with the string while pointer 16 slowly moves between television channels 6 and 7. During this latter period, string 29 is in winding engagement with large diameter section 46 of actuating drum 27, pointer 17 then traversing the FM band represented by the indicia on dial 11. Medium diameter section 45 and small diameter section 47 are in engagement with string 29 while pointer 16 is traversing the lower and upper portions of the television band, respectively.

The various diameters of the sections of the actuating drums 26 make possible a relatively uniform spacing of the numerals indicating the television channels and compensate for the fact that the required amount of rotation of the selector to tune between adjacent channels is less in the upper part of the television band than it is in the lower part. Large diameter section 46 of actuating drum 27 makes possible a large amount of movement of FM pointer 17 despite the fact that the entire FM band can be traversed with less than one revolution of the selector shaft, the FM band merely occupying about 20 megacycles. This is a very desirable feature and aids a person tuning the receiver by making visual determination of the location of a desired station easier and more accurate.

The importance of providing a relatively large diameter section for actuating the FM pointer across its dial may be appreciated more fully if it is realized that approximately six revolutions of the selector shaft tunes the receiver across the entire high frequency range from television channel 2 through television channel 13. About one and three-quarters revolutions of the selector shaft tunes the receiver for television channels 2 through 6 inclusively. The next one and one-quarter revolutions tune the receiver through the entire FM band. An additional one and three-quarters revolutions are required thereafter to cross that portion of the high frequency band which is devoted to neither television nor FM stations. The remaining approximately one and one-quarter revolutions of the selector tune the receiver to television channels 7 through 13 inclusively.

*Novel switch structure*

In order to energize lights 20 and 21 during the various active indicating periods of the upper and lower slide-rule dials, cam operated control switches 52 and 53, respectively, are provided. These switches are rigidly secured, as by rivets, to a bracket 54, insulating bushings 55 being disposed between the switches and the bracket proper so as to electrically isolate them from the bracket and consequently chassis 1 to which the bracket is secured. Switch 52 incorporates a spring finger 56 which is positioned to bear yieldingly on the periphery of reservoir drum 30. Switch 53 is provided with a similar spring finger 57 yieldingly bearing on the periphery of reservoir drum 31.

As long as the spring fingers are in bearing contact on the peripheries of the metallic reservoir drums, lights 20 and 21 are energized since the associated circuits are completed through the switch members, the reservoir drums and the chassis in a conventional manner.

In order to deenergize the circuits of lights 20 and 21, arcuate cams 58 and 59, respectively, are adjustably secured to reservoir drums 30 and 31, respectively, the cams being proportioned to project slightly beyond the peripheries of the reservoir drums proper. As the reservoir drums are rotated in response to rotation of the selector shaft, the cams are brought alternately into bearing relationship with the spring fingers, thereby camming the spring fingers away from the periphery of the reservoir drums and breaking the electrical circuits of the associated lights. The cams are made from any electrically insulating material, such as Bakelite, thus preventing completion of the electric circuit through the cam members themselves during engagement of the cams with the spring fingers of the switches.

Figures 2, 3A, 4A, and 5A, show the angular positions of the cam members corresponding to various positions of the indicator pointers shown, respectively, in Figures 2, 3, 4 and 5. From a review of these figures, it will be obvious that, as shown in Figure 2, slide-rule dial 10 is illuminated when the receiver is tuned to television channels in the lower portion of the transmitting band. At the transition position shown by Figure 3 where the receiver changes from television to FM reception, both lights are energized since the FM frequencies begin exactly where the television frequencies end. This condition only prevails for a very short time while the pointers are moved to the right, the cams eventually assuming the position shown in Figure 4A at the time the receiver is tuned for reception at the upper end of the FM band. Figure 4A clearly illustrates the fact that at this time slide-rule scale 11 is illuminated while scale 10 is not by virtue of the engagement of cam 58 with switch finger 56.

The cam positions shown in Figure 5A disclose, in a similar manner, the fact that slide-rule scale 10 is again illuminated while dial 11 is darkened when the receiver is tuned for the reception of stations in the upper portion of the television band.

During the travel of the pointers from the position of Figure 4 to that of Figure 5, both dials are darkened, signifying that the receiver is crossing an unavailable portion of the high frequency band and that no reception is possible.

Having described a preferred embodiment of my invention, I claim:

1. A tuning mechanism comprising a pair of coplanar slide-rule type indicating dials, a pair of movable pointers individually positioned for indicating movements relative to separates ones of said dials, rotary means for imparting predetermined indicating movements to one of said pointers, a second rotary means synchronized for rotation proportional to the first named rotary means for imparting predetermined indicating movements to the other of said pointers and filamentous means to transfer the motion of said first and second named rotary means to said respective pointers.

2. A tuning device comprising a pair of coplanar, parallel slide-rule type indicating dials; a pair of movable pointers individually positioned for linear indicating movements relative to separate ones of said dials; a pair of synchronized rotary means for imparting predetermined linear indicating movements to said pointers; filamentous means for transferring the rotary motion of said rotary means to said related pointers; and means responsive to the movement of said pointers for alternately illuminating each of said dials at predetermined intervals.

3. A tuning device comprising a pair of adjacent, coplanar, parallel slide-rule type indicating dials, one of said dials having two spaced groups of indicia and the other said dial having a group of indicia positioned intermediate of the groups on the adjacent dial; a pair of movable pointers individually positioned for linear indicating movements relative to separate ones of said dials; a pair of synchronized rotary means; filamentous means interconnecting said rotary means and said pointers for imparting linear indicating movements to said pointers in response to the rotation of said rotary means; and illuminating means responsive to the positions of said pointers for alternately illuminating each of said dials during the period when its associated pointer is in indicating relationship with a group of indicia.

4. A tuning device comprising a pair of adjacent, coplanar indicating dials; a pair of movable pointers individually positioned for indicating movements relative to separate ones of said dials; a pair of synchronized rotary actuating drums; a pair of filamentous elements associated with said drums and pointers for imparting movements to said pointers in response to rotation of said drums, and means for maintaining said filamentous elements under tension at all times.

5. Apparatus as defined in claim 4 in which said actuating drums comprise sections of different diameter, and means associated with said drums to guide said filamentous elements for engagement successively with the various sections as said actuating drums are rotated.

6. Apparatus as defined in claim 5 in which said tension maintaining means comprise rotary drums and associated resilient means for urging rotation of said drums in one direction at all times.

7. Apparatus as defined in claim 6 and, in addition, means for illuminating said dials, and switches responsive to the position of said last named rotary drums for alternately energizing said illuminating means.

8. In combination in an indicating mechanism; a pair of parallel, coplanar slide-rule type dials having spaced groups of indicia; a pair of linearly movable pointers individually disposed in indicating relationship with separate ones of said dials; disposed at one end of said dials a pair of synchronized rotary actuating drums, having a plurality of sections of different diameter; a pair of spring urged rotary reservoir drums disposed at the other end of said dials; a pair of strings, each one interconnecting one of said actuating drums and one of said reservoir drums, one of said pointers being secured to each of said strings; and means to guide the movements of said strings in response to rotation of said actuating drums.

9. Apparatus as defined in claim 8 and, in addition, normally closed electrical switching means; cams secured for conjoint rotation with each of said reservoir drums for periodically opening said switching means by engagement therewith; and adjacent each dial, a light bulb controlled by the operation of said switching means.

10. An indicating mechanism comprising a pair of slide-rule type dials; a pair of movable pointers individually disposed in indicating relationship with separate ones of said dials; at one end of said dials, a pair of synchronized rotary actuating drums each comprising a plurality of sections of different diameters; a pair of rotatable spring urged reservoir drums disposed at the other end of said dials; filamentous means interconnecting said actuating drums and reservoir drums for moving said pointers; and means associated with the sections of said actuating drums for guiding the filamentous means as it is wound and unwound as said drums are rotated.

11. Apparatus as defined in claim 10 and, in addition, a pair of normally closed electrical switches; a cam surface associated with each of said rotary reservoir drums for periodically opening said switches by engagement therewith; and associated with each switch a dial light energized at intervals when the associated switch is closed.

12. In combination with a combined television and FM receiver, a tuning mechanism comprising a continuously tunable selector device of the type having a rotatable control for adjusting it through a range including the five channels of the lower television band, the standard FM broadcast band, and the seven channels of the upper television band; a pair of coplanar-parallel slide rule type dials, the first one of said dials having two spaced groups of indicia and indicating the upper and lower television channels and the second of said dials having a group of spread indicia for indicating the FM stations centrally disposed relative to the groups of television indicia; a pair of movable pointers individually positioned for linear indicating movements relative to the indicia of separate ones of said dials; rotary means for imparting a predetermined sequence of medium, slow and fast indicating movements to one of said pointers associated with the first of said dials; a second rotary means for imparting a predetermined sequence of medium, fast and slow indicating movements to the other of said pointers; said first and second named rotary means being synchronized for rotation proportional to the rotation of said tunable selector device, both intermediate movements occurring when the pointer associated with said second dial is in registry with FM station indicia, and filamentous means for transferring the motion from said first and second rotary means to the respective related pointers.

13. A tuning mechanism comprising a pair of dials having spaced indicia, a pair of movable pointers individually disposed in indicating relationship with separate ones of said dials, a continuously rotatable tuning device, a first rotary means associated with said tuning device for effecting predetermined movements of one of said pointers in response to the rotation of said tuning device, a second rotary means operatively connected to said first rotary means for effecting predetermined movements of the other of said pointers, and means to transfer the motion of said first and second rotary means to their respectively associated movable pointers.

14. A tuning mechanism comprising a pair of dials having spaced indicia, a pair of pointers individually positioned for indicating movements relative to separate ones of said dials, a continuously adjustable tuning device, a first rotary means associated with said tuning device for effecting predetermined movements of one of said pointers at a periodically varying rate relative to a constant rate of adjustment of said tuning device, and a second rotary means operatively connected with said first rotary means for effecting predetermined movements of the other said pointer at a different periodically varying rate.

15. In combination with a combined television FM receiver, a tuning mechanism comprising a pair of slide rule type dials having spaced indicia, a pair of pointers individually positioned for linear indicating movements relative to the indicia on separate ones of said dials, a rotatable tuning device associated with the receiver, rotary means associated with said tuning device for corresponding rotation therewith, filamentous means associated with said rotary means for imparting predetermined linear movements to one of said pointers, motion transferring means operatively connected for rotation proportional to the rotation of said tuning device, and filamentous means associated with said motion transferring means for imparting predetermined linear indicating movements to the other of said pointers.

16. An apparatus as defined in claim 15 in which said rotary means and said motion transferring means are drums, each comprising a plurality of sections of different diameter and having helical grooves for guiding engagement with the associated filamentous means.

LEONARD S. DEPWEG.

REFERENCES CITED

The following references are of record in the file of this patent:

UNITED STATES PATENTS

| Number | Name | Date |
|---|---|---|
| 1,850,640 | Sperry | Mar. 22, 1932 |
| 1,885,621 | Newill | Nov. 1, 1932 |
| 2,128,833 | Martin | Aug. 30, 1938 |
| 2,129,756 | Elder | Sept. 13, 1938 |
| 2,132,094 | Brodton | Oct. 4, 1938 |
| 2,261,386 | Keblusek et al. | Nov. 4, 1941 |
| 2,270,772 | Schroder | Jan. 20, 1942 |
| 2,309,211 | Raphael | Jan. 26, 1943 |
| 2,359,125 | Langer et al. | Sept. 26, 1944 |
| 2,441,233 | Beers | May 11, 1948 |